April 26, 1949.
G. L. DIMMICK
2,468,048
PHOTOGRAPHIC SOUND RECORDING SYSTEM
AND MONITORING ARRANGEMENT THEREFOR
Filed Nov. 17, 1945
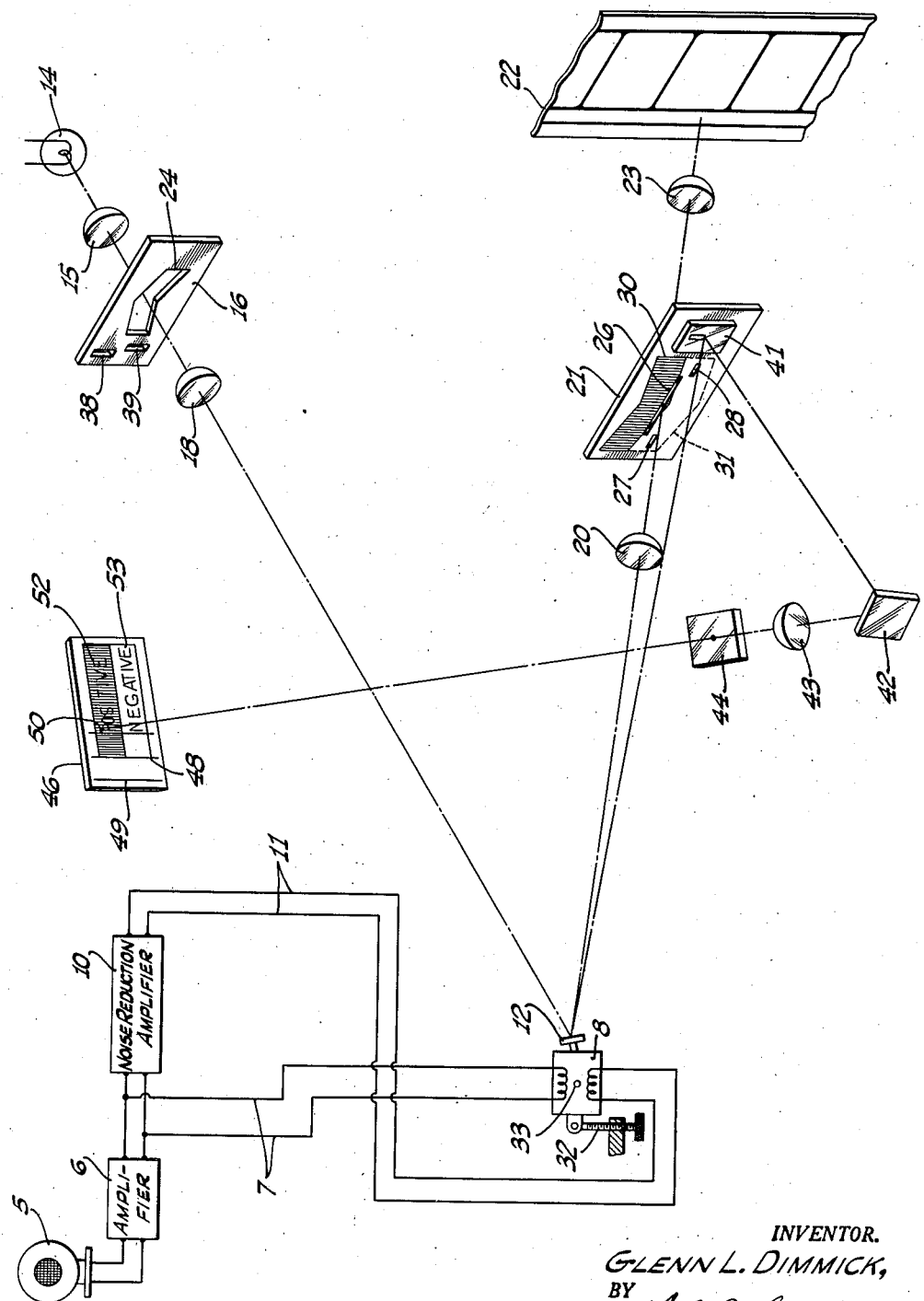
INVENTOR.
GLENN L. DIMMICK,
BY
ATTORNEY.

Patented Apr. 26, 1949

2,468,048

UNITED STATES PATENT OFFICE 2,468,048

PHOTOGRAPHIC SOUND RECORDING SYSTEM AND MONITORING ARRANGEMENT THEREFOR

Glenn L. Dimmick, Indianapolis, Ind., assignor to Radio Corporation of America, a corporation of Delaware Application November 17, 1945, Serial No. 629,295

7 Claims. (Cl. 179—100.3)

This invention relates to sound recording equipment, and particularly to a monitoring system for a combination recording system such as will record either a negative or a direct positive type of record.

In my copending application, Ser. No. 629,294, filed November 17, 1945, a type of recording system is disclosed and claimed, whereby, with the minimum of adjustment of the system, either a negative sound record or a direct positive sound record will be recorded along the same longitudinal portion of the film. The many advantages of such a system are pointed out in this copending application. To change from one type of recording to the other, it is only necessary to tilt the galvanometer slightly to an extent comparable to the width of the light beam passing the aperture mask. This is the only adjustment, and one which is not readily observable, so it is necessary to clearly indicate to the operator what type of sound record is being recorded at any particular time. The present invention accomplishes this result at the point where the operator observes the noise reduction adjustment and the extent of the modulations during actual recording. Thus, since he must watch his modulations, he is always aware of the type of record being recorded.

Monitors for recording systems using galvanometer modulators are well-known, one type being disclosed in Batsel U. S. Patent No. 2,220,198 of November 5, 1940, and another type being disclosed in Schomacker U. S. Patent No. 2,270,350 of January 20, 1942. These prior monitoring systems indicated the adjustment of the galvanometer for zero signal and provided an indication of the amplitude of the modulations during recording, but only one type of record was recorded. The present invention is directed to a monitoring system which not only provides the indications of the prior systems, but also indicates to the operator whether his system is adjusted to record a negative, a positive, or another form of sound record.

The principal object of the invention, therefore, is to facilitate the monitoring of a sound recording system.

Another object of the invention is to provide an improved method of and system for monitoring a sound recording system.

A further object of the invention is to provide an improved monitoring system for a recording system adapted to record different types of records and to indicate the type of record being recorded together with the modulation of the light beam.

A still further object of the invention is to provide an improved monitoring system for a sound recording system which not only indicates the adjustment and amount of modulation, but also whether or not the system is adjusted to record either a negative or a direct positive sound record.

Although the novel features which are believed to be characteristic of this invention will be pointed out with particularity in the appended claims, the manner of its organization and the mode of its operation will be better understood by referring to the following specification read in conjunction with the accompanying drawing, forming a part hereof, in which the single figure is a diagrammatic view of a sound recording system embodying the invention.

Referring now to the drawings, the output of a microphone 5 is fed into an amplifier 6, and then directly over conductors 7 to a galvanometer 8. The output of amplifier 6 is also fed to a noise reduction amplifier 10, and then over conductors 11 to the galvanometer 8, it being well understood that the galvanometer mirror 12 is vibrated both in accordance with the instantaneous values of the sound waves and the envelope of the sound waves. The remaining portion of the recording system includes a light source 14, a collecting lens 15, a mask plate 16, and a lens 18, together with a lens 20, a slit mask plate 21, a lens 23, and a film 22. In such a system, light from the lamp 14 is formed into a chevron-shaped light beam by the aperture 24 in the mask 16, then projected on the mirror 12 of the galvanometer 8 from which it is reflected to the slit mask 21, the light emerging through a slit 26 and slits 27 and 28 being impressed on the film 22, as will be described hereinafter.

In the aperture plate 16 are two vertically elongated apertures 38 and 39, the light through which is reflected by mirror 12 of galvanometer 8 to mirror 41 mounted on slit mask 21. When the galvanometer is tilted by hand screw 32 on pivot 33, so that the light beam is positioned on mask 21 as shown by the lined beam 30, light through the aperture 39 only will strike the mirror 41 and the light through aperture 38 will miss the mirror. Likewise when the galvanometer is adjusted by screw 32 so that the beam through aperture 24 strikes the mask 21 as shown by the dotted lines 31, then light through aperture 38 only impinges on mirror 41.

As pointed out in my above-mentioned copending application, when the light beam is in position 30, a negative record will be recorded, and when in position 31, a direct positive record will be recorded. The present invention will indicate to the operator at all times the type of record being recorded at a position where it is difficult to avoid observing the indication.

Referring now to the remaining portion of the drawing, light from mirror 41 is deflected upwardly by a mirror 42 through a projection lens 43 to a mirror 44, which projects the light substantially horizontally to a monitor card 46. This type of reflection and projection system is well-known, as evidenced by the above-mentioned patents. On the card 46 are three lines 48, 49, and 50, and two rectangles marked "positive" and "negative." When beam 30 is on the mask 21, light from aperture 39 will illuminate the rectangle marked "negative," and when beam 31 is on the mask 21, light from aperture 38 will illuminate the rectangle marked "positive." Therefore, whichever beam is on the card 46, this beam will move horizontally with the vibrations of mirror 12, line 48 indicating fifty percent modulation (illustrated position of beam on mask 21), and lines 49 and 50 indicating one hundred percent modulation.

With the above monitor arrangement, when the system is adjusted to record a negative record, the word "negative" will be observable on the monitor card, and when the system is adjusted to record a direct positive, the monitor card will so indicate.

Although the above monitoring system has been described and shown embodied in a sound recording system for recording either a negative or a direct positive record, it is to be understood that it may also be used with systems for recording other combination types of sound records, such as variable area and variable density records, as disclosed in my U. S. Patent No. 2,095,317 of October 12, 1937. When used with the recording system of this patent, the monitor card could be marked "area" and "density," although it is to be understood that any other form of distinguishing marks may be used on the card, such as differently colored strips, cross-hatched and plain rectangles, and the like. It is realized that the beams are projected to different vertical areas on the monitor card because of their horizontal displacement in the aperture mask, while their vertical separation will be comparable to the width of the recording light beam.

I claim:

1. A monitoring system for a sound recording system adapted to record either a negative record or a direct positive record comprising a source of light, a mask having a recording aperture and a plurality of spaced monitoring apertures therein, a slit mask, means for vibrating the light beams formed by all of said apertures, the vibration of one edge of the beam formed by said recording aperture along the slit in said slit mask producing a negative type of record, and the vibration of another edge of said recording aperture beam along the slit in said slit mask producing a direct positive type of record, a monitor card having portions differently characterized for indicating when said system is adjusted to record each different type of record, and means for projecting only one of said monitoring light beams to said monitor card in accordance with the particular type of record being recorded.

2. A monitoring system adapted to indicate the type of record being recorded at any instant comprising a light source, means for forming said light into a recording beam and a plurality of monitoring beams, means for vibrating said beams in accordance with sound waves to be recorded, a light slit mask, means for adjusting said recording beam on the light slit in said mask to record a certain type of record, one of said monitoring beams being positioned opposite each recording edge of said recording beam, a monitoring card characterized in different areas to indicate different types of records being recorded, and means for projecting the light beam from a particular monitoring aperture to said certain characterized area when that particular sound record is being recorded.

3. A monitoring system for indicating the recording of either a direct positive record or a negative record comprising a source of light, an aperture plate having a recording aperture and a pair of monitoring apertures therein, means for vibrating the light beams, passing through said apertures, a mask having a light slit for passing light to a film, a monitor card, having different areas for indicating the recording of different types of records, and means for projecting the light from one or the other of said monitoring apertures in accordance with the type of record being recorded, said light beam being impressed on the area of said card indicating said type of record being recorded.

4. A monitoring system for a recording system adapted to record more than one type of record by varying the no-signal position of a recording light beam comprising a light source, means for forming light from said source into a recording beam, one edge of said beam producing a negative record when impressed on a moving film, and the other edge of said beam producing a direct positive record when impressed on said film, a mask having a slit therein, means for forming light from said source into a pair of monitoring beams each monitoring beam lying opposite a recording edge of said recording beam, means for adjusting said recording light beam to its no-signal position on said slit, and means for selecting and projecting the particular monitoring light beam, opposite the operative recording edge of said recording light beam to a certain observation area.

5. A monitoring system in accordance with claim 4, in which a monitor card is provided as said observation area, said area being characterized to indicate the type of record being recorded.

6. A monitoring system in accordance with claim 4, in which a monitor card is provided as said observation area, said area being characterized to indicate the type of record being recorded, the vibrations of said monitoring light beam indicating the extent of modulation of said beam.

7. A monitoring system adapted to indicate the type of record being recorded at any instant comprising means for forming a recording beam, means for forming a plurality of monitoring beams, means for vibrating said beams in accord-